United States Patent
Ananbanchachai et al.

(10) Patent No.: US 10,599,028 B2
(45) Date of Patent: Mar. 24, 2020

(54) SPHERE ASSEMBLY

(71) Applicants: Nenin Ananbanchachai, Bangkok (TH); Lalin Ananbanchachai, Bangkok (TH); Jomzup Sittipitaya, Bangkok (TH); Ratchai Damnoenkittikun, Bangkok (TH)

(72) Inventors: Nenin Ananbanchachai, Bangkok (TH); Lalin Ananbanchachai, Bangkok (TH); Jomzup Sittipitaya, Bangkok (TH); Ratchai Damnoenkittikun, Bangkok (TH)

( * ) Notice: Subject to any disclaimer, the term of this patent is extended or adjusted under 35 U.S.C. 154(b) by 0 days.

(21) Appl. No.: 16/347,509

(22) PCT Filed: Dec. 21, 2016

(86) PCT No.: PCT/TH2016/000101
§ 371 (c)(1),
(2) Date: May 3, 2019

(87) PCT Pub. No.: WO2018/117984
PCT Pub. Date: Jun. 28, 2018

(65) Prior Publication Data
US 2019/0278165 A1    Sep. 12, 2019

(51) Int. Cl.
*G03B 21/58* (2014.01)
*G03B 21/62* (2014.01)

(52) U.S. Cl.
CPC ............. *G03B 21/58* (2013.01); *G03B 21/62* (2013.01)

(58) Field of Classification Search
CPC ........ G03B 20/60; G03B 20/62; G03B 21/60; G03B 21/62; G03B 21/58
(Continued)

(56) References Cited

U.S. PATENT DOCUMENTS 3,348,897 A * 10/1967 Hourdiaux ............. G03B 21/58
                                                     352/61
4,473,355 A *  9/1984 Pongratz .................. G09B 9/32
                                                     359/451
(Continued)

FOREIGN PATENT DOCUMENTS

CN      203350600 U    12/2013
CN      103777455 A     5/2014
(Continued)

OTHER PUBLICATIONS

International Search Report dated Aug. 9, 2017 from corresponding PCT Application No. PCT/TH2016/000101.

*Primary Examiner* — Christopher E Mahoney
(74) *Attorney, Agent, or Firm* — Innovation Capital Law Group, LLP; Vic Lin (57) ABSTRACT

A sphere assembly comprises a set or network of curved and triangularly-shaped transparent panels (2) placed next to one another to form a spherical shape of a sphere (1), a set of project films (3) placed on the transparent panels, and a set of connectors (4) for connecting the adjacent curved transparent panels to one another. The sphere assembly may be positioned so that the sphere assembly is held and placed in a secure and well-balanced position for the virtual reality (VR), augment reality (AR), or mixed reality (MR) gameplay or environment. The projection films can receive images or sensory cues from a set of projectors which project images from the VR, AR, or MR environment to the sphere assembly. The projectors may connect upstream to at least one image processing module which receives and processes image information from a player's headset, controller, and other tracking sensors.

27 Claims, 5 Drawing Sheets

(58) Field of Classification Search
USPC .......................................................... 359/451
See application file for complete search history.

(56) References Cited

U.S. PATENT DOCUMENTS

| | | | | |
|---|---|---|---|---|
| 4,750,807 | A * | 6/1988 | Chamayou dit Felix | ................... G03B 21/56 359/451 |
| 5,724,775 | A * | 3/1998 | Zobel, Jr. | .............. E04B 1/3211 359/443 |
| 6,348,993 | B1 * | 2/2002 | Hori | ....................... G03B 21/62 359/443 |
| 9,097,968 | B1 * | 8/2015 | Acevedo | ................. G06T 3/005 |
| 2012/0247030 | A1 | 10/2012 | Magpuri | |
| 2018/0088455 | A1 * | 3/2018 | Cippant | ................. G03B 21/62 |

FOREIGN PATENT DOCUMENTS

| | | |
|---|---|---|
| CN | 204463728 U | 7/2015 |
| JP | 2006267740 A | 10/2006 |
| KR | 20070061258 A | 6/2007 |
| WO | 2009035552 A2 | 3/2009 |

\* cited by examiner

SPHERE ASSEMBLY

FIELD OF THE INVENTION

A sphere assembly according to this invention relates to the field of structural engineering of a transparent sphere for acting as a prominent structure for a first-person player inside the sphere and third-party, external observers to engage or interact with in any of a virtual reality (VR), augmented reality (AR), or a mixed reality (MR) environment so that the player and the third-party observers may experience the environment together. The transparent surface of the sphere additionally acts as a projecting and interacting surface for any third-party or external observers to observe or experience what the player is seeing or experiencing inside the sphere through the real-time projection and/or generation of images being seen or other sensory cues being experienced inside the VR, AR, or MR environment onto at least one part or the whole surface of the sphere.

BACKGROUND OF THE INVENTION

Virtual reality (VR, augmented reality (AR), and mixed reality (MR) related equipment, gadgets, and technologies have received tremendous interests and tractions over the past years due to the rises of many industries such as the gaming, entertainment, advertising, and edutainment industries, which have increasing demands for these technologies as parts of their product or service offerings and which serve as means to induce both players and external observers' interests and involvements into the products or services that the vendors are providing-leading to increase brand awareness, sales, and customer royalties. Many related gadgets ranging from headsets, goggles, gloves, footpads, helmets or even full-body suits are already available in the market for home users. While the market for home-based VR, AR, or even MR products are increasing, the development of a simulator platform, such as VR sphere or VR simulator, that can seamlessly provide an interactive surface for the projection and interaction of images and other inputs being experienced by a first-person with the third-party, external observers has not been well-developed.

Figure 1:
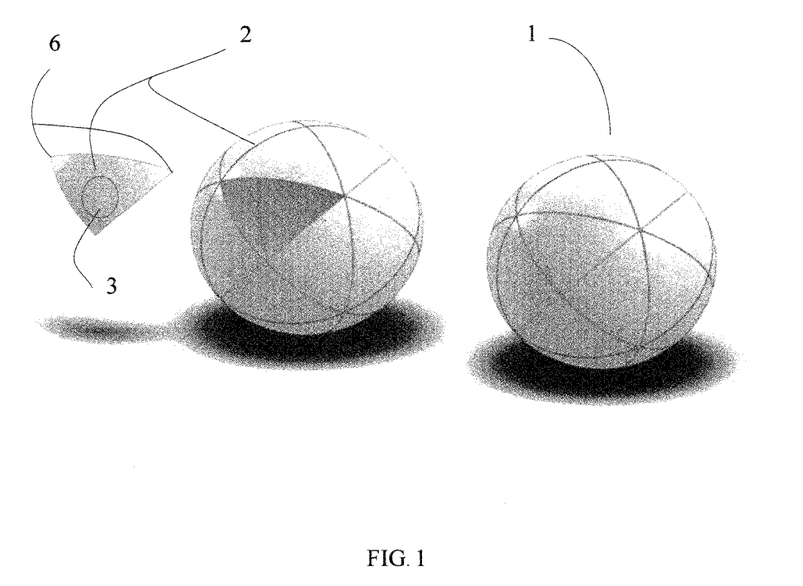
FIG. 1 shows a general overview of one possible concept of spherical shape of a sphere that comprises a set of curved, triangularly shaped units that fit together to create a sphere.

The sphere assembly according to this invention is developed for the purposes of utilizing it as a prominent simulation platform for VR, AR, and MR environments whereby the sphere assembly as illustrated in FIG. 1 is essentially made up of connected network of curved and triangularly-shaped transparent panels laid with their projector films and connectors to make up the whole, smooth surface of the sphere in their entirety in order for the images and or any related sensory inputs received from these environments to be projected onto the surface, whether in part or in whole, so that the external observers around the sphere can also observe and experience what the first-person player is seeing or experiencing inside the sphere in real-time. Such sphere assembly is also cost-efficient and easy to replicate, remove, and relocate to any other locations at ease. Further, the sphere assembly can also be integrated with any other frame structure or anchoring device or structure depending on its intended usage.

SUMMARY OF THE INVENTION

The invention generally relates to a sphere assembly and their supporting module for utilizing and interacting with any of the conventional and emerging VR, AR, or MR equipment and technologies wherein the sphere assembly comprising a network of curved, and triangularly-shaped transparent panels placed next to one another to form a spherical shape of a sphere, a set of projection films placed on said set of curved transparent panels, and a set of connectors for connecting the panels to one another. At least one curved transparent panel may act as a door panel with corresponding connecting hinges for entry and exit by user or internal equipment The curved panels, door panel, their connectors, and/or connecting hinges can be made up of clear or transparent glass materials, glass-like materials, or plastic materials which can be of the same material or different materials and can be produced by any process known for manufacturing glass panels and solid sheets such as vacuum thermoforming or injection molding. The projector films which are placed on the panels are capable of receiving images from a projector or set of projectors to aid the display of images on the sphere and wherein said projector or set of projectors project images from a VR, AR, or MR environment onto the sphere. The projector or the set of projectors may further connect upstream to at least one image processing module which receives and processes image information from various inputs and sensors inside the VR, AR, or MR environment.

Figure 4:
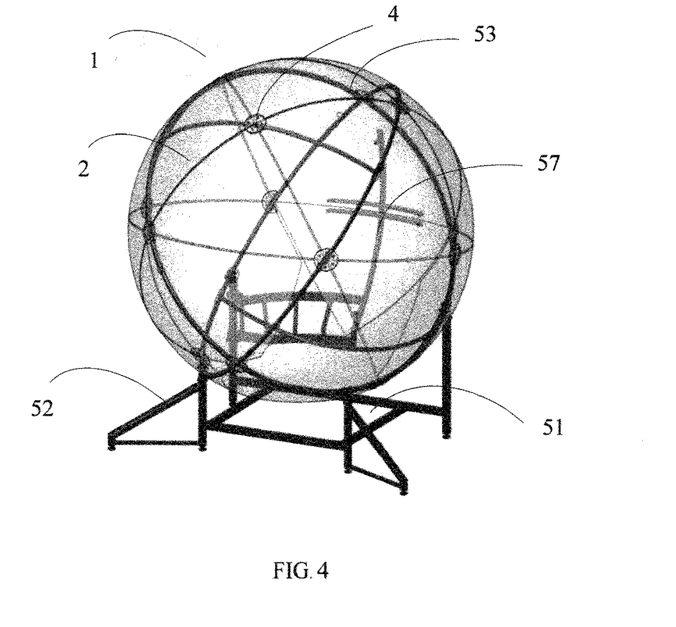
FIG. 4 illustrates one embodiment of the sphere assembly according to this invention after incorporating the sphere assembly with the sphere holding module.
Figure 5:
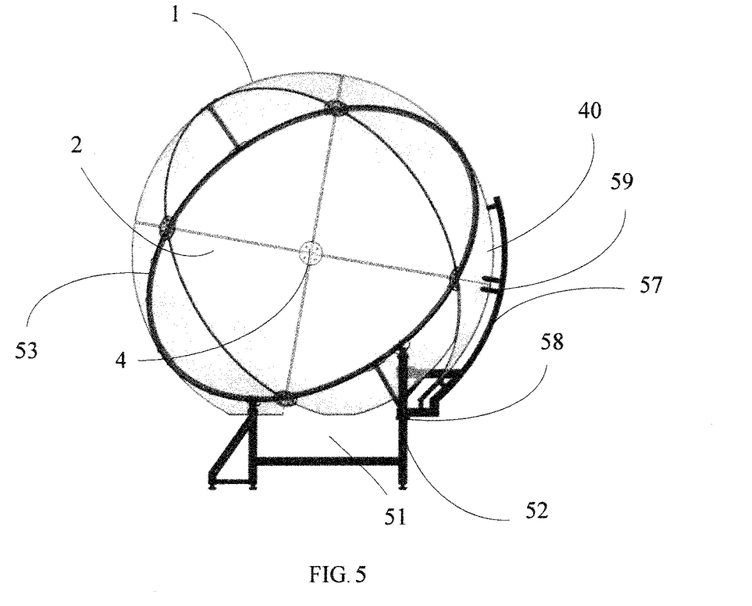
FIG. 5 illustrates one embodiment of the sphere assembly according to this invention after incorporating the sphere assembly with the sphere holding module wherein a door panel on the sphere assembly is closed.
Figure 6:
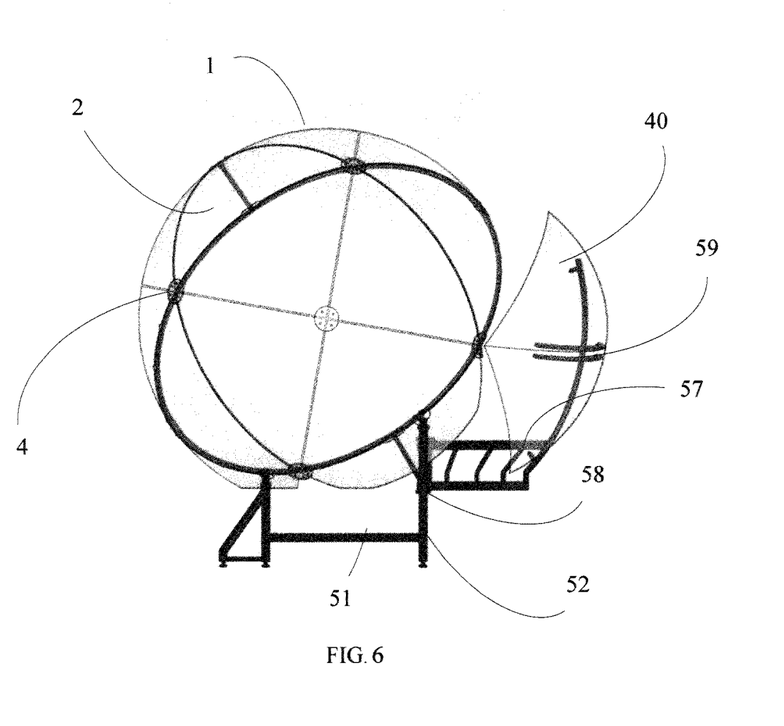
FIG. 6 illustrates one embodiment of the sphere assembly according to this invention after incorporating the sphere assembly with the sphere holding module wherein the door panel on the sphere assembly is being opened.

Additionally, the sphere assembly according to this invention may be positioned on a frame, a stand, a base, or any other anchoring device or structure to hold and place the sphere in a secure position for the VR, AR, or MR gameplay which may require players physical movement or activity. The sphere holding module comprising a base, a set of sphere holding rings, and a set of base-to-ring connects are provided to hold and secure the sphere in a robust and well-balanced position. The general overview of one embodiment of the sphere assembly after connecting to the sphere holding module is represented by FIGS. 4-6 wherein the door structure is also presented and is connected to at least one post of the base by at least one door hinge on one part and to the door panel on another part.

BRIEF DESCRIPTION OF THE DRAWINGS

FIG. 7 illustrates a set of examples of connectors for the sphere assembly according to this invention wherein (from top to bottom.

DETAILED DESCRIPTION OF THE INVENTION

Figure 2:
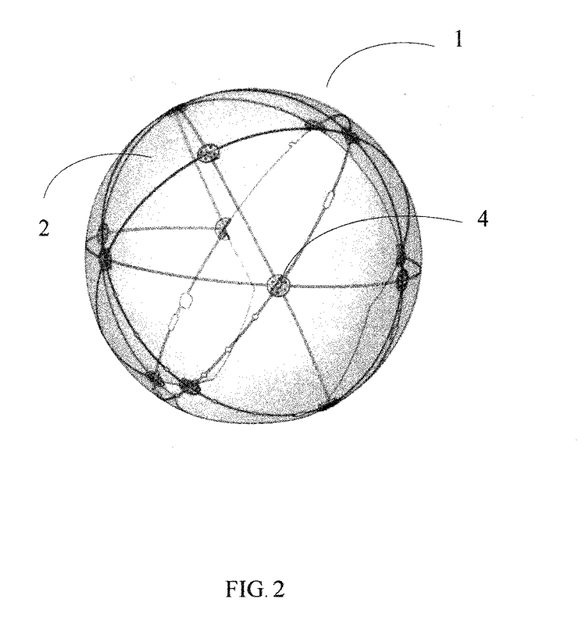
FIG. 2 illustrates one embodiment of the sphere assembly according to this invention before connecting to or incorporating with a sphere holding module.

A sphere assembly according to this invention which is suitable, but not limited, to utilizing together with any of the VR, AR, or MR equipment and technologies can be viewed in FIG. 1 (in concept) and FIG. 2 (in one actual embodiment) wherein the sphere assembly generally comprising:

A set or network of identical, curved, and triangularly-shaped transparent panels (2) placed next to one another to form a spherical shape of a sphere (1);

A set of projection films (3) placed on said set of curved transparent panels (2); and A set of connectors (4) located at the edges (6) of the panels (2) for connecting the connecting curved transparent panels (2) to one another.

In one embodiment, the connectors (4) may comprise a set of holes for penetration or fastening of a set of fasteners with a set of adjacent or connecting curved transparent panels (2) through a set of holes of said panels (2) wherein the holes of the connecting panels (2) shall suitably align with the holes of the connectors (4).

Figure 7A:
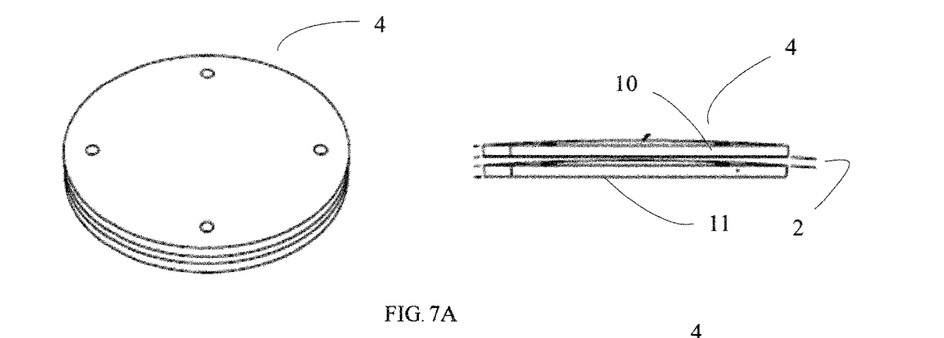
FIG. 7A illustrates perspective and eye-level views of one embodiment of the connector connecting a set of transparent panels together, FIG. 7B illustrates perspective and eye-level views of one embodiment of the connector for connecting the set of transparent panels together wherein one portion of said connector comprises an indentation for engulfing or holding one part of a sphere holding ring of the sphere holding module, FIG. 7C illustrates perspective and eye-level views of one embodiment of the connector for connecting the set of transparent panels together wherein one portion of said connector comprises an indentation for engulfing or holding one intersecting part of the two sphere holding rings of the sphere holding module, and FIG. 7D illustrates perspective and eye-level views of one embodiment of the connector which is a connecting hinge for connecting the door panel to other transparent panels wherein the door panel connecting portion of said hinge may be rotatable and wherein one portion of said connecting hinge has an indentation for holding or engulfing the sphere holding ring of the sphere holding module.
Figure 7B:
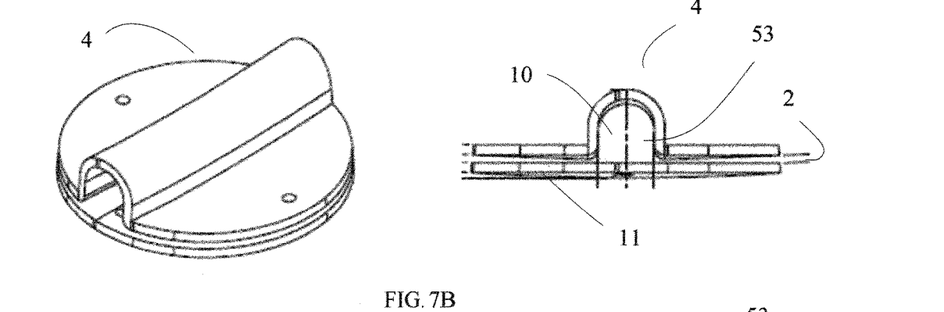
Figure 7C:
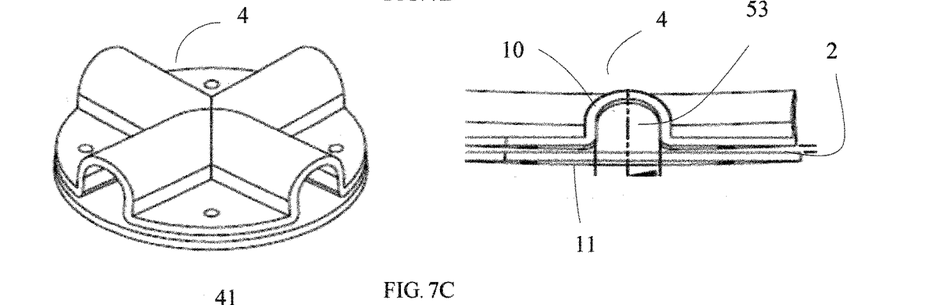

In a second embodiment as illustrated in FIGS. 7A-7C, the connectors (4) may comprise two separable portions as follows:

An external portion (10) placed on an external side of the sphere (1); and

An internal portion (11) placed on an internal side of the sphere (1).

The external portion (10) may comprise a set of holes that align with a set of holes of the internal portion (11) and wherein the holes of the two portions (10, 11) also align with a set of holes of a set of the inserted, curved transparent panels (2) for complete penetration or fastening of the fasteners with and into all three layers (2, 10, and 11).

Figure 7D:
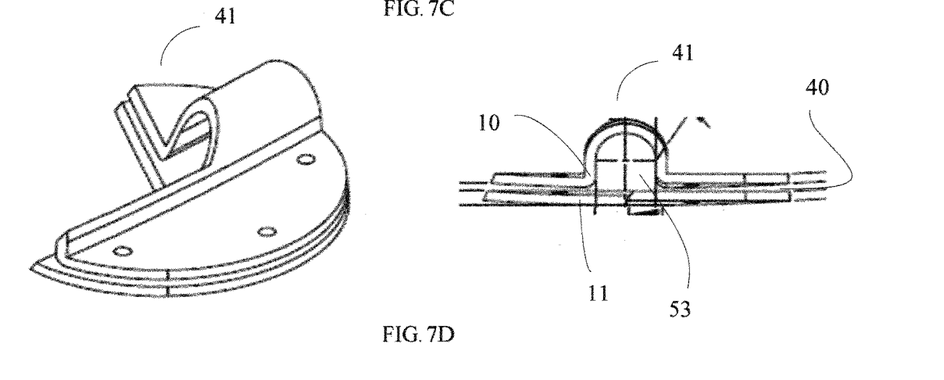

According to FIG. 7D, it is possible that at least one curved transparent panel (2) acts as a door panel (40) for entry and exit by a player or an internal equipment and wherein the connector (4) of said door panel (40) is a connecting hinge (41) with one rotatable part for swinging the door panel (40) open or close on at least one side and further connecting said door panel (40) to other adjacent panels (2).

The fasteners which may be used to penetrate the connectors (4) or the connecting hinges (41) may be chosen from any fasteners known to the field of engineering or may be chosen from at least a set of nuts and bolts, a set of nuts and screws, screws, and a set of nuts, bolts, and washers.

Figure 8:
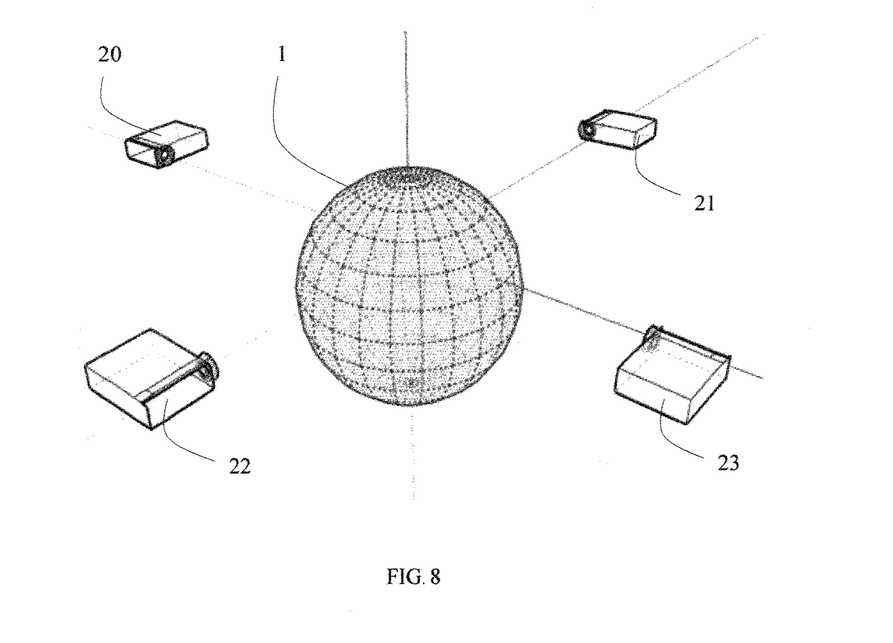
FIG. 8 illustrates one possible arrangement of a set of projectors facing toward the sphere for projection of images onto the surface of said sphere.
Figure 9:
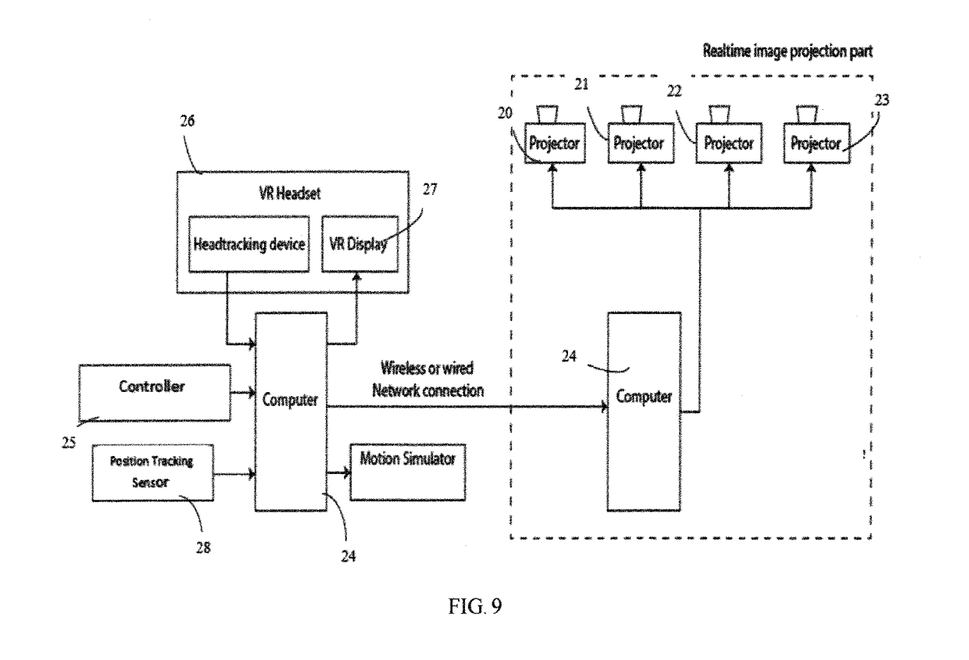
FIG. 9 illustrates a flow diagram of one embodiment of the VR image processing and projection system for the sphere.

Both the transparent panels (2) and their connectors (4) and/or connecting hinges (41) are preferably made up of clear or transparent glass materials, glass-like materials, or plastic materials which may be chosen from any one or more of the following materials: acrylic, glass, polycarbonate, or acrylonitrile butadiene styrene (ABS). Both the transparent panels (2) and their connectors (4) or connecting hinges (41) can be made up of the same material or different materials and can be produced by any process known for manufacturing glass panels and solid sheets such as vacuum thermoforming or injection molding. In one preferred embodiment, the transparent panels (2) and their connectors (4) and/or hinges (41) are made up of transparent and thermoformed acrylic plastic materials with thickness of 2-10 mm, or preferably 3-5 mm for producing in most cost-efficient manner and for displaying or generating good image results on the surface of the sphere (1) as part of the VR, AR, or MR gameplay or environment. The transparent panels (2) and the door panel (40) are most preferably identically shaped as described above and wherein at least 20-25 units of 70-140× 110-260 cm each may be produced to create the entire smooth surface of the sphere (1). Further, the projector films (3) which are being placed on the curved and triangularly shaped transparent panels (2) or on at least one part of the external surface of the sphere (1) can receive images from a projector (20) and aid the display of images on the sphere (1) wherein said projector (20) or a set of projectors (20-23) project images from a VR, AR, or MR environment onto the sphere (1) as illustrated in FIG. 8. The projector (20) or the set of projectors (20-23) may further connect upstream to at least one image processing module (24), such as a computer (24) with multi-display technology, fisheye distortion effect, and geometrical correction and edge blending effect, which receives and processes image information from at least one of a first computer (24), a controller (25), a VR headset (26), a position tracking sensor (28), and an image display panel (27) inside the VR, AR, or MR environment. In one example of the VR environment as illustrated in FIG. 9, the first computer (24) may collect inputs from the controller (25), the position tracking sensors (28), and visual and tracking information from the VR headset (26) via the VR display (27) and headtracking device, then responding back to a first-person player through motion simulator and/or VR headset, and further transmitting those inputs to the second computer (24) in a real-time projection part. The second computer (24) then correct, integrate, and blend those series of images received and transmitting the images to the projectors (20-23) for real-time projection of images onto the sphere (1) of the sphere assembly according to this invention.

Figure 3:
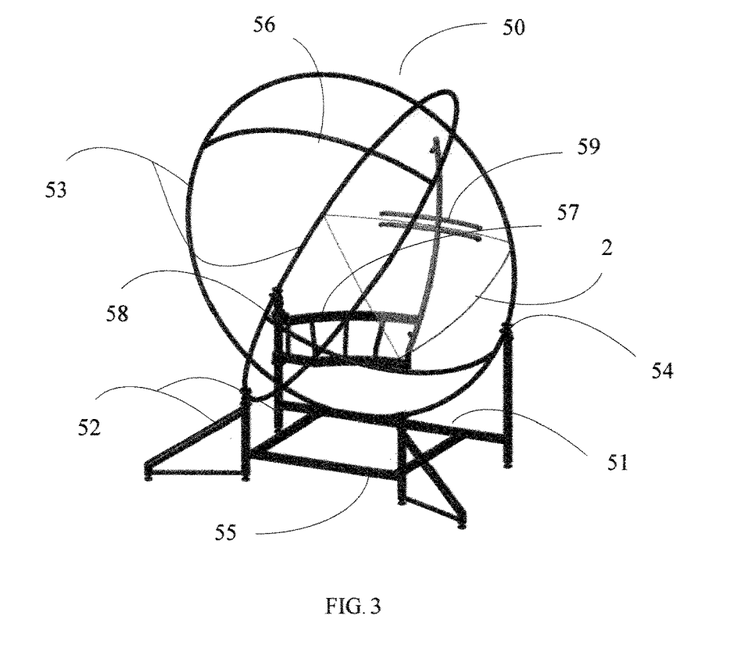
FIG. 3 illustrates one embodiment of the sphere holding module according to this invention before connecting to or incorporating with the sphere assembly.

The sphere assembly generally comprising the set of curved and triangularly shaped transparent panels (2) and their connectors (4) and/or connecting hinges (41) according to this invention may be positioned on a frame, a stand, a base, or any other anchoring device or structure to hold and place the sphere (1) in a secure position for the VR, AR, or MR gameplay or related activities. In one embodiment according to FIG. 3, a sphere holding module (50) is further provided to hold and secure the sphere (1) in position wherein the module (50) generally comprising:

A base (51) with at least three posts (52);
A set of sphere holding rings (53); and
A set of base-to-ring connectors (54).

Preferably, the base (51) further comprises at least one base beam (55) capable of withstanding or distributing a weight from the sphere (1); but most preferably, the base (51) comprises four posts (52) with a set of base beams (55) connected between these posts (52) for maximum holding strength. The sphere holding rings (53) also preferably comprise at least one ring beam (56) for holding the sphere holding rings (53) together and for withstanding or distributing a weight from the sphere (1); but most preferably, the sphere holding module (50) comprises two sphere holding rings (53) that suitably fit to the contour or shape of the sphere (1) and wherein the two sphere holding rings (53) intersect each other at 90° angle so that the sphere (1) is suitably supported by the rings (53) at a central and well-balanced position. Further, the sphere holding module (50) preferably comprises four base-to-ring connectors (54) wherein the first two connectors (54) connect the first two posts (52) to the bottom portion of the first sphere holding ring (53) and the latter two connectors (54) connect the latter two posts (52) to the bottom portion of the second sphere holding ring (53). The general overview of one embodiment of the sphere assembly after connecting to the sphere holding module (50) is represented by FIGS. 4-6 wherein the door structure (57) is also presented and is connected to at least one post (52) by at least one door hinge (58) on one part and to the door panel (40) with, optionally, a door handle (59) on another part. FIG. 5 illustrates one embodiment during closing of the door panel (4) and FIG. 6 illustrates one embodiment during opening of the door panel (4), accordingly.

With regards to the connectors (4) according to FIGS. 7B-7C, their external portions (10) may further comprise at least one indented part for engulfing or holding one part of the sphere holding ring (53) of the sphere holding module (50) or for engulfing or holding one intersecting part of the two sphere holding rings (53) of the sphere holding module (50). The connecting hinge (41) as illustrated in FIG. 7D may similarly comprise at least one indented part on the external portion (10) for holding or engulfing the sphere holding ring (53) of the sphere holding module (50) or for engulfing or holding one intersecting part of the two sphere holding rings (53) of the sphere holding module (50), accordingly.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the claims that follow.

The invention claimed is:

1. A sphere assembly comprising:
a set of curved and triangularly-shaped transparent panels (2) placed next to one another to form a spherical shape of a sphere (1);
a set of projection films (3) placed on said set of curved transparent panels (2); and
a set of connectors (4) located at the edges (6) of the panels (2) for connecting the transparent panels (2) to one another, wherein
the connector (4) comprises two separable portions: an external portion (10) placed on an external side of the sphere (1) and an internal portion (11) placed on an internal side of the sphere (1) and wherein the external portion (10) comprises a set of holes that align with a set of holes of the internal portion (11) and wherein the holes of said portions (10, 11) also align with a set of holes of a set of connecting curved transparent panels (2) for a complete penetration or fastening of the fasteners with all three layers (2, 10, and 11).

2. The sphere assembly according to claim 1 wherein the connector (4) comprises a set of holes for penetration or fastening of a set of fasteners with a set of connecting or adjacent curved transparent panels (2) through a set of holes of said panels (2) wherein the holes of the connecting panels (2) suitably align with the holes of the connector (4).

3. The sphere assembly according to claim 2 wherein the fastener is chosen from a set of nut and bolt, a set of nut and screw, a screw, and a set of nut, bolt, and washer.

4. The sphere assembly according to claim 1 wherein the connector (4) is transparent.

5. The sphere assembly according to claim 1 wherein the sphere (1) is virtual reality sphere.

6. The sphere assembly according to claim 1 wherein the sphere (1) is an augmented reality sphere.

7. The sphere assembly according to claim 1 wherein the sphere (1) is a mixed reality sphere.

8. The sphere assembly according to claim 1 wherein the projector film (3) is capable of receiving images from a projector (20) and aiding the display of images on the sphere (1) wherein said projector (20) or a set of projectors (20-23) project images from a virtual reality (VR) environment.

9. The sphere assembly according to claim 8 wherein the projector (20) or the set of projectors (20-23) are connecting upstream to at least one image processing module (24) which receives and processes image information from at least one of a controller (25), a virtual reality (VR) headset (26), a position tracking sensor (28), and an image display panel (27) inside the environment.

10. The sphere assembly according to claim 1 wherein the projector film (3) is capable of receiving images from a projector (20) and aiding the display of images on the sphere (1) wherein said projector (20) or a set of projectors (20-23) project images from an augmented reality (AR) environment.

11. The sphere assembly according to claim 1 wherein the projector film (3) is capable of receiving images from a projector (20) and aiding the display of images on the sphere (1) wherein said projector (20) or a set of projectors (20-23) project images from a mixed reality (MR) environment.

12. The sphere assembly according to claim 1 wherein each curved transparent panel (2) is 2-10 mm thick.

13. The sphere assembly according to claim 1 wherein each curved transparent panel (2) is 3-5 mm thick.

14. The sphere assembly according to claim 1 wherein the curved transparent panels (2) have uniform thickness.

15. The sphere assembly according to claim 1 wherein the curved transparent panels (2) have varying thickness.

16. The sphere assembly according to claim 1 wherein the curved transparent panels (2) are chosen from any one or more of the following materials: acrylic, glass, polycarbonate, or acrylonitrile butadiene styrene (ABS).

17. The sphere assembly according to claim 1 wherein the connectors (4) are chosen from any one or more of the following materials: acrylic, glass, polycarbonate, or acrylonitrile butadiene styrene (ABS).

18. A sphere assembly comprising:
- a set of curved and triangularly-shaped transparent panels (2) placed next to one another to form a spherical shape of a sphere (1);
- a set of projection films (3) placed on said set of curved transparent panels (2); and
- a set of connectors (4) located at the edges (6) of the panels (2) for connecting the transparent panels (2) to one another, wherein
- the connector (4) comprises a set of holes for penetration or fastening of a set of fasteners with a set of connecting or adjacent curved transparent panels (2) through a set of holes of said panels (2) wherein the holes of the connecting panels (2) suitably align with the holes of the connector (4); and
- at least one curved transparent panel (2) acts as a door panel (40) for entry and exit by a player or an internal equipment and wherein the connector (4) of said door panel (40) is a connecting hinge (41) for swinging the door panel (40) open or close on at least one side and further connecting said door panel (40) to other adjacent panels (2).

19. A sphere assembly comprising:
- a set of curved and triangularly-shaped transparent panels (2) placed next to one another to form a spherical shape of a sphere (1);
- a set of projection films (3) placed on said set of curved transparent panels (2); and
- a set of connectors (4) located at the edges (6) of the panels (2) for connecting the transparent panels (2) to one another; and
- a sphere holding module (50) for holding the sphere (1) wherein the sphere holding module (50) comprises:
 - a base (51) with at least three posts (52);
 - a set of sphere holding rings (53); and
 - a set of base-to-ring connectors (54).

20. The sphere assembly according to claim 19 wherein the base (51) further comprises at least one base beam (55) capable of withstanding or distributing a weight from the sphere (1).

21. The sphere assembly according to claim 19 wherein the sphere holding rings (53) further comprise at least one ring beam (56) capable of holding the sphere holding rings (53) together and for withstanding or distributing a weight from the sphere (1).

22. The sphere assembly according to claim 19 wherein the base (51) comprises four posts (52) with a set of base beams (55) connecting between posts (52).

23. The sphere assembly according to claim 19 wherein the sphere holding module (50) comprises two sphere holding rings (53) that suitably fit to the contour of the sphere (1).

24. The sphere assembly according to claim 23 wherein the two sphere holding rings (53) intersect each other at 90° angle so that the sphere (1) is suitably supported by the rings (53) at a central and well-balanced position.

25. The sphere assembly according to claim 19 wherein the sphere holding module (50) comprises four base-to-ring connectors (54) wherein the first two connectors (54) connect the first two posts (52) to the bottom portion of the first sphere holding ring (53) and the latter two connectors (54) connect the latter two posts (52) to the bottom portion of the second sphere holding ring (53).

26. The sphere assembly according to claim 19 wherein a door structure (57) connects to at least one post (52) with at least one door hinge (58) on one part and to a door panel (40) with a door handle (59) on another part.

27. The sphere assembly according to claim 19 wherein the door panel (40) is preferably one curved transparent panel (2) of the sphere (1).

\* \* \* \* \*